United States Patent Office 3,508,949
Patented Apr. 28, 1970

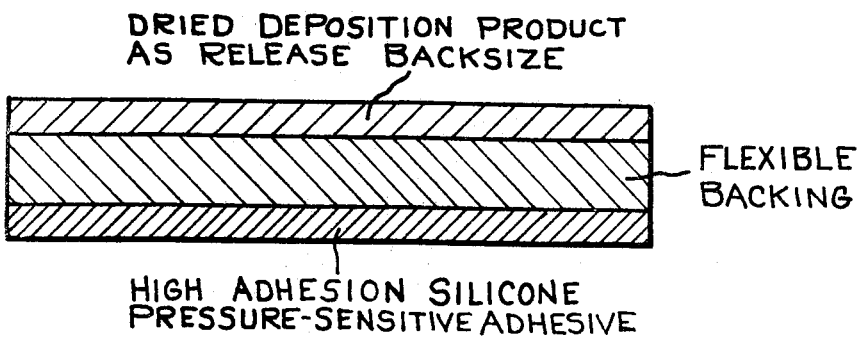

3,508,949
RELEASE AGENTS FOR SILICON PRESSURE-SENSITIVE ADHESIVES
Richard F. Grossman, Voorheesville, and Charles S. Webber, Loudonville, N.Y., assignors to Norton Company, Troy, N.Y., a corporation of Massachusetts
Filed Jan. 19, 1967, Ser. No. 610,339
Int. Cl. B44d 1/10; C09g 7/02
U.S. Cl. 117—68.5
6 Claims

ABSTRACT OF THE DISCLOSURE

Release agents specific to high adhesion silicone pressure-sensitive adhesives are formed by treating the reaction product of a long straight chain (at least 14 C atoms) fatty acid in an alcoholic solution and a compound selected from the group consisting of vanadium oxytrichloride, molybdenum pentachloride and antimony pentachloride with a solution of water and a water-soluble secondary amine selected from the group consisting of morpholine and amines having the structure:

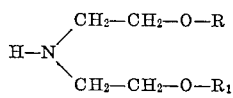

wherein R and $R_1$ may be either hydrogen or alkyl groups.

---

The present invention relates in general to release agents for pressure-sensitive adhesive tapes or the like and more specifically to release agents for use with high adhesion silicone pressure-sensitive adhesives.

BACKGROUND OF THE INVENTION

Field of the invention

The present invention lies in the area of providing release surfaces to which pressure-sensitive adhesives have only a low affinity. The products used to coat surfaces to produce this low affinity are known in the art as release agents. This particular invention finds its main value in the field of pressure-sensitive adhesive tapes.

Description of the prior art

In recent years high adhesion silicone pressure-sensitive adhesives have been developed particularly for use in applications where high resistance to heat is required. These adhesives do not release readily from the conventional release agents heretofore used in the pressure-sensitive tape art and have generally been used only with fluorocarbon release agents. Such fluorocarbon products are extremely expensive and as a result, use of these high tack silicone adhesives has been limited.

SUMMARY

The present invention provides inexpensive release agents specific to the high adhesion silicone type pressure-sensitive adhesives and permits the development and use of this type of adhesive in tapes for high and low temperature applications. The use of the specific vanadium, molybdenum and antimony complexes, described in the abstract and more fully below, as release agents for high adhesion silicone pressure-sensitive adhesives provides a simple and effective release coating which can be applied to flexible paper, film or cloth backings conventionally used in the tape art. The release coating can also be applied to rigid steel, glass or the like backings which are to be in contact with such silicone adhesives where it is desired to keep such adhesives from adhering to the rigid material.

DRAWINGS

FIGURE 1 is a cross-sectional view of a pressure-sensitive adhesive tape showing the location of the release agents of the present invention with respect to the silicone adhesive.

DESCRIPTION OF THE PREFERRED EMBODIMENTS

Complexes of vanadium, molybdenum and antimony with a straight carbon chain fatty acid are mixed with or diluted by a solution of water and water-soluble secondary amine. The resulting aqueous solution is relatively stable and when coated on a backing dries to a clear film. Such films have a specific low affinity for high adhesion silicone adhesives and as a result are extremely effective release agents for this type of adhesive.

The invention requires that the mol ratio of fatty acid to the vanadium, molybdenum or antimony inorganic or oxyhalide, as the case may be, approximate 1:2. Slight variations from this ratio are permissible but any marked deviation drastically impairs the utility of the reaction product as a release agent. The dilution should be such as to produce a 1–5% solution of the complex in the amine-water solvent.

The following specific examples illustrate the preparation of the release agents of the present invention:

EXAMPLE 1

30 g. (0.1 mol) of stearic acid were dissolved in 100 ml. of dry isopropanol and 34 g. (0.2 mol) of vanadium oxytrichloride were added dropwise with stirring. The reaction was maintained at 30° C. with external cooling and yielded an orange-red solution. This solution was then added to a solution of 280 g. of morpholine in 1000 g. distilled water. This dilution left a green solution which turned colorless after several minutes and deposited as a clear film on glass. Similar results were obtained using diethanolamine in place of the morpholine.

EXAMPLE 2

30 g. of stearic acid in 100 ml. anhydrous ethanol were added dropwise to 55 g. molybdenum pentachloride, yielding a green solution. Dilution with 300 g. morpholine in 1200 g. water gave a clear grey solution which deposited clear films on glass.

EXAMPLE 3

30 g. of stearic acid in 150 ml. dry tertiary-butanol were added dropwise to 60 g. antimony pentachloride, yielding a violet solution after a vigorous reaction. Dilution with 300 g. morpholine in 1200 g. water gave a brownish soapy solution which deposited as a clear film on glass. A similar result was obtained using as the amine diluent, dimethyldiethanolamine.

EXAMPLE 4

35 g. behenic acid in 300 ml. dry isopropanol were reacted with 34 g. vanadium oxytrichloride. The resultant solution was diluted with 280 g. morpholine in 1000 g. distilled water to give a colorless solution which left a clear film on glass.

EXAMPLE 5

26 g. palmitic acid in 100 ml. dry isopropanol were reacted by dropwise addition to 55 g. molybdenum pentachloride. Dilution of the resulting solution with 300 g. morpholine in 1200 g. water gave a clear grey solution which likewise deposited clear films on glass. Similarly, use of diethanolamine in place of the morpholine produced a solution giving clear film deposit on glass.

EXAMPLE 6

24 g. myristic acid in 150 ml. dry tertiarybutanol were added dropwise to 60 g. antimony pentachloride and the resulting solution diluted with 300 g. morpholine in 1200 g. distilled water. The brownish solution deposited as a clear film on glass.

The compositions of Examples 1–6 were coated as release agents on 1 mil polyethylene terephthalate films. In Examples 1–6, each release agent consists of a 5% solution of the vanadium, molybdenum or antimony complex in the morpholine-water solvent. After coating, each release film was allowed to dry and the polyethylene terephthalate film was then reverse-roll coated on the opposite side with approximately 1.0 oz./sq. yd. of a typical high tack silicone adhesive having the following formulation:

|  | Parts |
|---|---|
| G.E. silicone resin SR520 [1] | 100 |
| Benzoyl peroxide | 1 |
| Toluene | 100 |

[1] A commercially-available polydimethyl silicone resin having free hydroxyl groups, supplied as a 60% solution in xylene by the General Electric Company, Waterford, N.Y.

The adhesive composition was cured for 15 minutes at 280° F. after air drying. Rolls of tape prepared as above were then subjected to conventional 180° peel measuring tests (at a speed of 12 inches/minute) to determine (A) adhesion of the silicone adhesive to the release coat; and (B) adhesion of the tape to stainless steel. These tests were carried out with the freshly-prepared tapes and also after various periods of accelerated aging. The results were as follows:

TABLE A

| Example number | Release (g./in. width) (average of three samples) | | | | | |
|---|---|---|---|---|---|---|
|  | 1 | 2 | 3 | 4 | 5 | 6 |
| No aging | 500 | 500 | 525 | 475 | 500 | 500 |
| 24 hrs., room temp | 500 | 500 | 500 | 500 | 475 | 550 |
| 16 hrs., 150° F | 600 | 575 | 620 | 580 | 600 | 650 |
| 6 days, 150° F | 620 | 600 | 625 | 600 | 600 | 700 |
| 6 days, 150° F., 85% RH | 650 | 600 | 650 | 620 | 650 | 800 |
| 30 days, 150° F | 625 | 650 | 650 | 600 | 660 | 750 |
| 30 days, 150° F., 85% RH | 675 | 650 | 680 | 640 | 700 | 820 |

TABLE B

| Example number | Adhesion of stainless steel (g./in. width) (average of three samples) | | | | | |
|---|---|---|---|---|---|---|
|  | 1 | 2 | 3 | 4 | 5 | 6 |
| No aging | 1,620 | 1,600 | 1,650 | 1,580 | 1,600 | 1,640 |
| 24 hrs., rm. temp | 1,580 | 1,620 | 1,600 | 1,600 | 1,570 | 1,650 |
| 16 hrs., 150° F | 1,600 | 1,580 | 1,620 | 1,580 | 1,550 | 1,620 |
| 6 days, 150° F | 1,540 | 1,560 | 1,560 | 1,540 | 1,520 | 1,550 |
| 6 days, 150° F., 85% RH | 1,480 | 1,510 | 1,520 | 1,460 | 1,500 | 1,460 |
| 30 days, 150° F | 1,440 | 1,460 | 1,480 | 1,420 | 1,470 | 1,500 |
| 30 days, 150° F., 85% RH | 1,400 | 1,410 | 1,425 | 1,380 | 1,400 | 1,440 |

With reference to Table A, it will be seen that even after 30 days of accelerated aging, the release force required to separate the silicone adhesive surface from the adjacent release-coated surface in the tape roll was not excessive. In general, release force of less than 1000 g./in. width is deemed satisfactory. In contrast to the above results, identical tapes using conventional polydimethyl silicone release agents required 2000 and 1650 g./in. release force after the 30-day aging period. Such conventional release agents, while satisfactory initially, began to go bad and freeze up or block the tape within the 6-day test period, definitely proving to be unsatisfactory for this purpose. Similarly, reaction products according to the present invention but using as the fatty acid component an acid with a chain length of less than 14, e.g., lauric acid, gave almost as poor aging results with a release force of 1600 g./in. width being required after 30 days of accelerated aging.

Table B illustrates that the adhesion to stainless steel of the silicone mass is not materially affected even after the adhesive has been in contact for the 30-day accelerated aging period with the release agents of the present invention. This test is important since some release agents, while effective in promoting release characteristics, will impair the adhesion properties of the adhesive mass to the point where it is useless.

Chromium and aluminum complexes with fatty acids were found to be ineffective when used with the silicone adhesives. Only antimony pentachloride, molybdenum pentachloride and vanadium oxytrichloride were found to give satisfactory release properties. The dilution of the complex requires the presence of a water-soluble secondary amine selected from the group consisting of morpholine and amines having the structure:

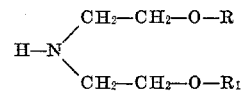

wherein R and $R_1$ are hydrogen or an alkyl group. Examples of such amines include diethanolamine and dimethyldiethanolamine. Tertiary amines and simple secondary amines do not yield products having adequate release from silicone adhesives. Polyamines and watersoluble primary amines yield insoluble precipitates with the complexes of this invention. The length of the fatty acid chain is at least 14 C atoms as illustrated in the examples and Table A. The mol ratio of fatty acid to halide is 1:2 approximately, again as illustrated in the examples. As indicated above, the dilution with the amine-water solution is carried out to the extent that the resultant solution is one of from 1% to 5% by weight of the fatty acid-halide complex. The amount of the secondary amine employed in the diluent ranges from 10% to 50% based on the weight of water employed in the dilution.

Obviously, the release agents of the present invention can be used in the same manner as previously known release agents, i.e., while shown as a backsize coating on a tape, these release agents can also be used to coat liner papers to be inserted in tape rolls or between sheets of the silicone-coated backings, or to coat surfaces to which limited adhesion by the silicone mass is required. In general, the release agents of the present invention find application wherever a surface is to be in contact with a high adhesion silicone-based adhesive and the need for easy separation of such surface from the adhesive exists.

What is claimed is:

1. A pressure-sensitive adhesive tape comprising a flexible backing, a normally tacky high adhesion silicone adhesive coating firmly bonded to one surface of said backing and a release coat firmly bonded to the opposite face of said backing, said release coat being the dried deposition product of a solution of the reaction product of a long straight chain fatty acid having at least 14 C atoms with a compound selected from the group consisting of vanadium oxytrichloride, molybdenum pentachloride and antimony pentachloride, said solution comprising from 1% to 5% by weight of said reaction product in a water-amine solvent, the amine component of which is a water-soluble secondary amine selected from the group consisting of morpholine and amines having the structural formula:

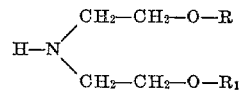

wherein R and $R_1$ are selected from the group consisting of hydrogen and alkyl groups and wherein the mol ratio of the fatty acid to the compound in said reaction product is 1:2.

2. An adhesive tape as in claim 1 wherein said compound is vanadium oxytrichloride.

3. An adhesive tape as in claim 1 wherein said compound is molybdenum pentachloride.

4. An adhesive tape as in claim 1 wherein said compound is antimony pentachloride.

5. An adhesive tape as in claim 1 wherein the amine component is morpholine.

6. An adhesive as in claim 1 wherein the amine component is diethanolamine.

References Cited

UNITED STATES PATENTS 3,162,660  12/1964  Crayton _____ 260—414

WILLIAM D. MARTIN, Primary Examiner

B. D. PIANALTO, Assistant Examiner

U.S. Cl. X.R.

117—122